United States Patent [19]
Handschy et al.

[11] Patent Number: 5,596,451
[45] Date of Patent: Jan. 21, 1997

[54] MINIATURE IMAGE GENERATOR INCLUDING OPTICS ARRANGEMENT

[75] Inventors: Mark A. Handschy, Boulder; Michael R. Meadows, Nederland, both of Colo.; Martin Shenker, Pomona; Paul E. Weissman, Brewster, both of N.Y.

[73] Assignees: Displaytech, Inc., Boulder, Colo.; Martin Shenker Optical Design, Inc., White Plains, N.Y.

[21] Appl. No.: 380,081

[22] Filed: Jan. 30, 1995

[51] Int. Cl.$^6$ ............................................... G02B 27/14
[52] U.S. Cl. ........................... 359/633; 359/639; 359/640
[58] Field of Search ............................. 359/13, 630, 633, 359/635, 639, 640

[56] References Cited

U.S. PATENT DOCUMENTS

| | | | |
|---|---|---|---|
| 4,943,155 | 7/1990 | Cross, Jr. | 353/33 |
| 4,969,730 | 11/1990 | van den Brandt | 353/31 |
| 5,164,848 | 11/1992 | Firth et al. | 359/13 |
| 5,270,804 | 12/1993 | Lach | 358/62 |

*Primary Examiner*—Georgia Y. Epps
*Assistant Examiner*—Thomas Robbins
*Attorney, Agent, or Firm*—Stephen C. Shear

[57] ABSTRACT

An assembly for producing a visual display includes a light-reflecting type spatial light modulator and an illumination arrangement for providing a particular source of light. The spatial light modulator has a light reflecting surface cooperating with a light modulating medium switchable between different states so as to act on light in ways which form an overall pattern of reflected, modulated light. The spatial light modulator also has an arrangement for switching the modulating medium between the different states in a controlled way so as to form the overall pattern. The overall assembly further includes an optics arrangement having a first member defining a light reflecting surface. The optics arrangement also has a second member defining (i) a first external face located in proximity to the illumination arrangement, (ii) a second external face located in proximity to the spatial light modulator, (iii) a third external face located in proximity to the light reflecting surface of the first member, and (iv) a fourth external face. The optics arrangement cooperates with the illumination arrangement and the spatial light modulator such that the spatial light modulator forms the overall pattern of modulated light from light provided by the particular source of light and such that the light reflecting surface of the first member forms a magnified image of the overall pattern which is viewable from within a predetermined area which extends away from the fourth face of the second member.

43 Claims, 5 Drawing Sheets

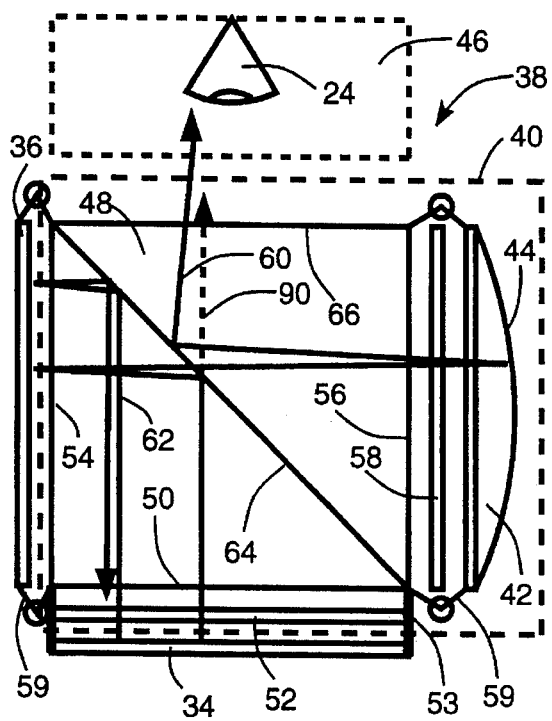
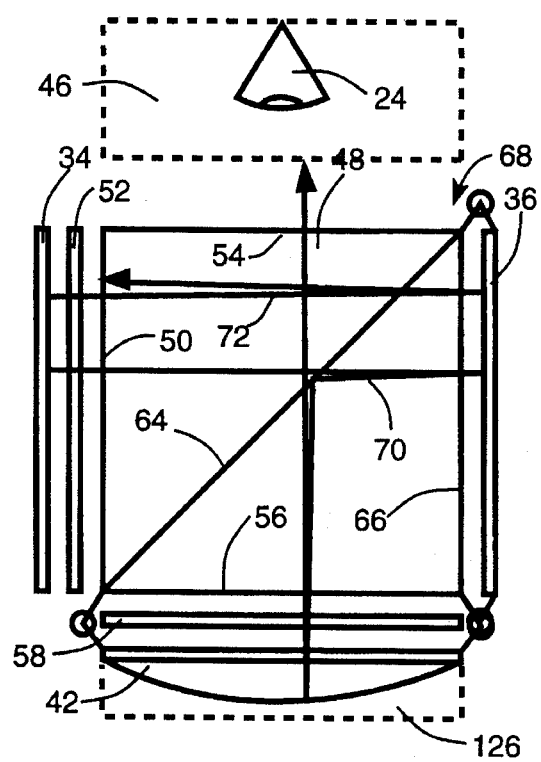
Fig. 2A
Fig. 2B
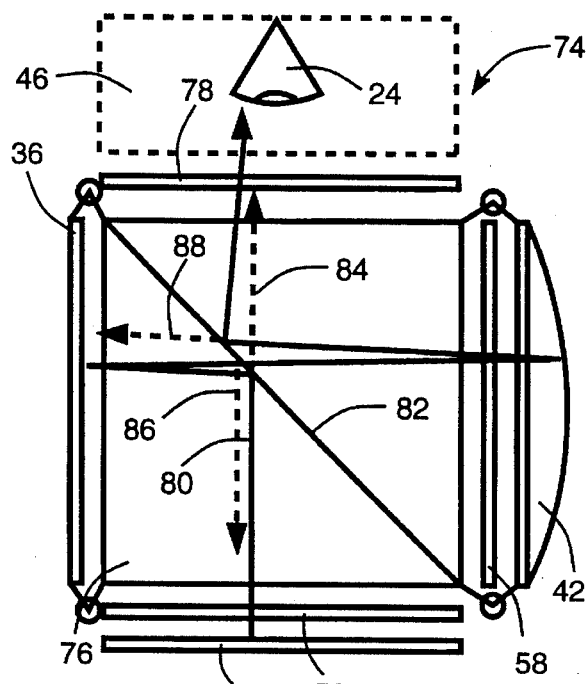
Fig. 2C

MINIATURE IMAGE GENERATOR INCLUDING OPTICS ARRANGEMENT

GOVERNMENT CONTRACT CLAUSE

This invention was made with Government support under contract NAS 9-19102 awarded by the National Aeronautics and Space Administration and contract DAA H01-94-CR154 awarded by the Advanced Research Projects Agency. The Government has certain rights in this invention.

BACKGROUND OF THE INVENTION

The present invention relates generally to image generating systems, and more particularly to optics arrangements especially suitable for miniaturized image generating systems such as the miniaturized image generator disclosed in pending U.S. patent application Ser. No. 08/362,665 Attorney Docket Number DIS1P003 entitled ACTIVE MATRIX LIQUID CRYSTAL IMAGE GENERATOR filed Dec. 22, 1994.

One of the ongoing challenges facing the manufacture of miniature image generating systems is providing smaller and more durable systems. Miniature image generating systems which are small enough to be mounted onto a helmet or small enough to be supported by a pair of eyeglasses will find a wide variety of uses if they can provide adequate resolution and brightness in a small, low-power, and durable pack, age at a low cost. Conventional technologies such as CRTs are difficult to miniaturize and therefore do not hold much promise for further development in this field. Alternatively, new systems based on VLSI integrated circuits are currently being developed which provide much smaller spatial light modulators for use in a miniaturized image generating systems. However, one of the problems in this field is providing optics and illuminating arrangements which may be scaled down in coordination with the miniaturized spatial light modulator in order to provide an overall image generating system which is practical and compact enough to be mounted onto a helmet or supported by a pair of glasses. Pending U.S. patent application Ser. No. 08/362,234 Attorney Docket Number DIS1P005 entitled OPTICS ARRANGEMENTS INCLUDING LIGHT SOURCE ARRANGEMENTS FOR AN ACTIVE MATRIX LIQUID CRYSTAL IMAGE GENERATOR filed Dec. 22, 1994, discloses novel arrangements for providing various illumination and optics arrangements which address some of these problems and which may be incorporated into certain embodiments of the present invention.

Referring to FIG. 1A, a prior art miniature image generator system generally designated by reference numeral 10 will be described. System 10 includes a miniature CRT 12 which produces a desired image. A beam splitting cube 14 is positioned such that a first external face 16 of cube 14 is located adjacent to the light emitting surface of CRT 12. System 10 also includes an optical element 18 having a curved light reflecting surface 20 positioned adjacent to a second external face 22 of cube 14. As shown in FIG. 1A, this arrangement results in an overall system which allows a viewer to view the image produced by CRT 12 when the viewer's eye, indicated at 24, is positioned in front of a third external face 26 of cube 14.

In the above described arrangement, as indicated by line 28 in FIG. 1, a portion of the light emitted from CRT 12 into cube 14 is reflected toward optical element 18 by an internal beam splitting layer 30 positioned diagonally within cube 14. Curved light reflecting surface 20 of optical element 18 reflects this light back through cube 14 such that a portion of the light passes through beam splitting layer 30. This arrangement allows a viewer to view the image produced by CRT 12 when the viewer's eye is positioned in front of external cube face 26.

Alternatively, as shown in FIG. 1B wherein like components are designated by like reference numerals in FIGS. 1A and 1B, if cube 14 is a polarizer-analyzer beam splitting cube, hereinafter referred to as a polarizing beam splitting cube, internal layer 30 would be a polarizing beam splitting layer which directs light of one polarization, for example S-polarized light, from CRT 12 into optical element 18. For this arrangement, a quarter wave plate 32 is positioned between cube 14 and optical element 18. As described above, curved light reflecting surface 20 of optical element 18 reflects this light back through cube 14. However, for the polarizing beam splitting version, quarter wave plate 32 changes the polarization of the light directed into optical element 18 such that the light directed back into cube 14 by optical element 18 is the opposite polarization, in this example P-polarized light. This P-polarized light passes through polarizing beam splitting layer 30 allowing a viewer to view the image produced by CRT 12 when the viewer's eye is positioned in front of external cube face 26.

Although the above described prior art arrangements are functional, because a CRT is used to form the desired image, there are limitations in how far this arrangement can be scaled down. As will be seen hereinafter, the present invention provides a variety of novel optics arrangements which, when combined with miniaturized spatial light modulators in novel ways, are capable of providing compact miniaturized image generating systems that may be used to produce a direct view miniature display substantially smaller than the CRT based systems described above.

SUMMARY OF THE INVENTION

As will be described in more detail hereinafter, an assembly for producing a visual display is herein disclosed. The assembly includes a spatial light modulator, preferably of the light reflecting type, and an illumination arrangement for providing a particular source of light. The spatial light modulator, in its preferred embodiment, has a light-reflecting surface cooperating with a light modulating medium switchable between different states so as to act on light in ways which form an overall pattern of reflected, modulated light, that is a picture at any given instant in time. The spatial light modulator also has an arrangement for switching the modulating medium between the different states in a controlled way so as to form the overall pattern. The overall assembly further includes an optics arrangement having a first member defining a light-reflecting surface configured to direct reflected light into a predetermined area. The optics arrangement also has a second member defining (i) a first external face located in proximity to the illumination arrangement, (ii) a second external face located in proximity to the spatial light modulator, (iii) a third external face located in proximity to the light reflecting surface of the first member, and (iv) a fourth external face. The optics arrangement cooperates with the illumination arrangement and the spatial light modulator such that the spatial light modulator forms the overall pattern of light from light provided by the particular source of light and such that the light reflecting surface of the first member directs light provided by the particular source of light from the spatial light modulator into the predetermined area which extends outwardly from the fourth face of the second member. This assembly allows a magnified image of the overall pattern of light formed at and by the spatial light modulator, that is a picture, to be viewed from within the predetermined area. The overall pattern of light serves as the visual display.

In the embodiment of the present invention just recited, the second member is a polarizer-analyzer beam splitting cube which defines the first through fourth external faces referred to above. In a second embodiment of the present invention, the optics arrangement includes a first member defining a light reflecting surface configured to direct reflected light into a predetermined area. The optics arrangement also includes a second member defining (i) a first external face located in proximity to the illumination means, (ii) a second external face located in proximity to the spatial light modulator, and (iii) a third external face. And, the optics arrangement also includes a third member defining (i) a first external face immediately adjacent the third face of the second member, (ii) a second external face located in proximity to the light reflecting surface of the first member, and (iii) a third external face in close proximity to the predetermined area into which the first member directs light. In one version of this second embodiment, the second and third members are both polarizer-analyzer beam splitting cubes.

BRIEF DESCRIPTION OF THE DRAWINGS

The features of the present invention may best be understood by reference to the following description of the presently preferred embodiments together with the accompanying drawings in which:

FIG. 2A is a diagrammatic side view of a fast configuration of a first embodiment of a miniature image generating system designed in accordance with the present invention;

FIG. 2B is a diagrammatic side view of a second configuration of a first embodiment of a miniature image generating system designed in accordance with the present invention;

FIG. 2C is a diagrammatic side view of a second embodiment of a miniature image generating system designed in accordance with the present invention;

DETAILED DESCRIPTION OF THE PREFERRED EMBODIMENTS

Figure 1A:
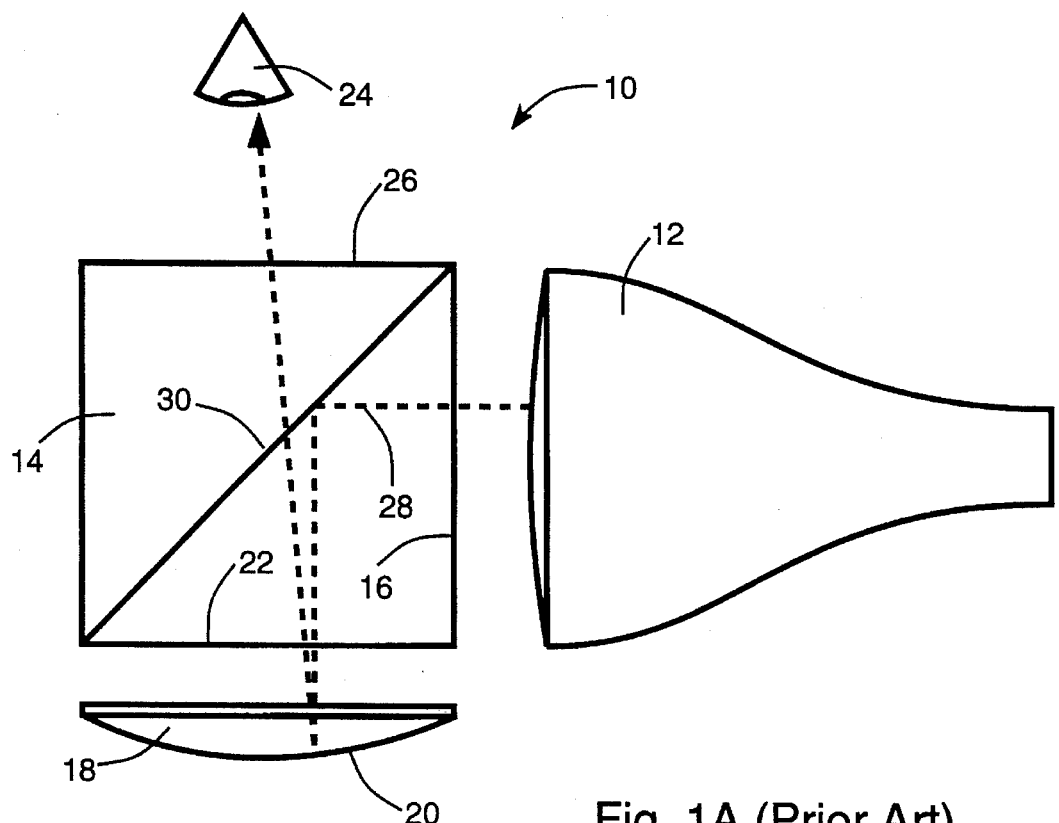
FIG. 1A is a diagrammatic side view of a prior art miniaturized image generating system including a beam splitting cube.
Figure 1B:
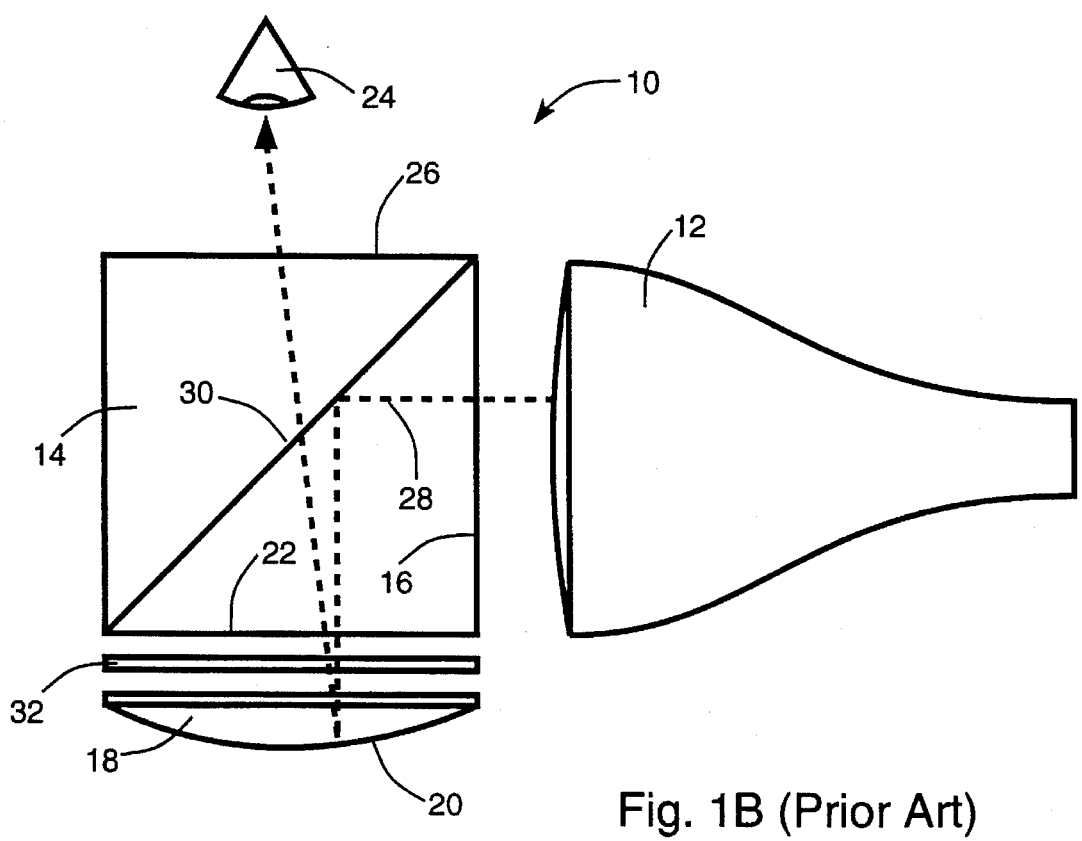
FIG. 1B is a diagrammatic side view of a prior art miniaturized image generating system including a polarizing beam splitting cube.

Turning to FIGS. 2A–C, 3A–E, and 4, wherein like components are designated by like reference numerals throughout the various figures, the general optical elements of optical arrangements, designed in accordance with the present invention, for an image generating system are illustrated. As shown in the figures, each assembly includes a suitable and readily providable illumination arrangement 34. Illumination arrangement 34 may be any device or combination of devices that exhibit luminance or may be illumination produced by and optical system that may be focused in proximity to the position occupied by arrangement 34 in the drawings. The purpose of the illuminator is to illuminate the apparent field of view of the image generator. Arrangement 34 may include, but is not limited to, light sources such as (i) one or more light emitting diodes (LEDs), (ii) laser diodes, (iii) cold cathode or field emitter cathodoluminescent sources, (iv) incandescent and fluorescent lamps together with a switchable color filter such as Displaytech's RGB Fast Filter (a trademark of Displaytech, Inc.) color filter, (v) or a variety of other light sources including novel light source arrangements disclosed in the previously recited pending U.S. patent application Ser. No. 08/362,234, Attorney Docket Number DIS1P005. The assemblies also include a suitable and readily providable spatial light modulator 36 which is typically and preferably a reflective type light modulator that modulates the light directed into the spatial light modulator by either changing or not changing the polarization of the light depending on the ON/OFF status of each pixel making up the spatial light modulator. One preferred novel arrangement for spatial light modulator 36 is disclosed and its operation described in detail in the previously recited pending U.S. patent application Ser. No. 08/362,665, Attorney Docket Number DIS1P003. Although the above cited preferred spatial light modulator is a reflective ferroelectric liquid crystal spatial light modulator, the present invention is not limited to such a spatial light modulator, but instead, would equally apply to spatial light modulators using means other than ferroelectric liquid crystal material as the light modulating medium, for example nematic liquid crystal.

In accordance with the present invention, the assemblies shown in FIGS. 2A–C and 3A–D also include an optics arrangement which, as will be described in more detail hereinafter, cooperates with illumination arrangement 34 and spatial light modulator 36 to generate a viewable image. This optics arrangement may take on a variety of specific configurations, some of which are described below for the currently preferred embodiments of the present invention.

Referring now to FIG. 2A, a first preferred embodiment of the present invention, generally designated by reference numeral 38, will be described in detail. As mentioned above, assembly 38 includes illumination arrangement 34, spatial light modulator 36, and an optics arrangement 40. Optics arrangement 40 includes a first member, specifically a mirror 42 having a curved light reflecting surface 44 which is configured to, in cooperation with other members of optics arrangement 40, direct light into a predetermined area 46. Optics arrangement 40 also includes a second member, which in this embodiment is a polarizer-analyzer beam splitting cube 48, hereinafter referred to as polarizing beam splitting cube 48, having a plurality of external surfaces or faces. As shown in FIG. 2A, illumination arrangement 34 is positioned in proximity to and in optical communication with a first external face 50 of cube 48. If illumination arrangement 34 produces light which is not polarized, an auxiliary polarizer 52 is positioned between illumination arrangement 34 and face 50 of cube 48. Illumination arrangement 34 can be readily removably attached adjacent to face 50 of cube 48 to allow for replacement or repair of this component, as indicated generally at 53. Also, spatial light modulator 36 is positioned in proximity to and in optical communication with a second external face 54 of cube 48 and mirror 42 is positioned in proximity to a third face 56 of cube 48 and a quarter wave plate 58 is positioned between minor 42 and face 56 of cube 48. In this preferred embodiment of the present invention, mirror 42 and/or spatial light modulator 36 are readily adjustably attached adjacent to face 54 and/or face 56, respectively, as indicated generally at 59. This arrangement allows the distance between minor 42 and face 56 of cube 48 and/or the distance between spatial light modulator 36 and face 54 of cube 48 to be adjusted within a predetermined range of distances thereby providing means for focusing the image generated by the assembly.

Still referring to FIG. 2A, the operation of the assembly will be described. Polarizing beam splitting cube 48 includes a polarizing beam splitting film or layer 64 positioned within cube 48 such that one side of film 64 faces external faces 50 and 54 of cube 48, and the other side of film 64 faces external face 56 and a fourth external face 66 of cube 48. As indicated by lines 60 and 62, which represent light provided by illumination arrangement 34, light produced by illumination arrangement 34 is linearly polarized by auxiliary polarizer 52 such that S-polarized light is directed into film 64 within cube 48. It is to be understood that fines 60 and 62 and all other fines subsequently used to trace light through the assemblies are illustrative only and are not intended to represent a ray trace as is commonly performed in the course of an optical design. It is also to be understood that the term S-polarized light is used in the common manner wherein it specifies that the electric vector of the light incident on a reflective surface is perpendicular to the plane of incidence, in this case the plane of the drawing. Continuing now with the operation of the assembly, since film 64 is a polarizing beam splitting film, the majority of the S-polarized light 60 is directed into spatial light modulator 36. Spatial light modulator 36 is a reflective spatial light modulator having a reflective surface and a light modulating medium, in this case a ferroelectric liquid crystal layer, which is switchable between different states. The reflective surface and the modulating medium cooperate to act on light in ways that form an overall pattern of reflected, modulated light, which constitutes a modulation encoding of a picture which may be viewed. For this embodiment, the S-polarized light which is directed into spatial light modulator 36 is modulated by the ferroelectric liquid crystal material such that the overall pattern of reflected, modulated light is a pattern of light of S-polarized light and P-polarized light which is orthogonally polarized to the S-polarized light. At any point in this pattern, the polarization depends on the state of the corresponding pixelated portions of the ferroelectric liquid crystal material through which the S-polarized light from illumination arrangement 34 has passed. Spatial light modulator 36 directs this modulated light back into cube 48 where the light is analyzed by polarizing beam splitting film 64, as will be described immediately below.

The purpose of analyzing the pattern is to decode the polarization modulated pattern and transform it into a brightness modulated pattern which can be viewed and recognized as a display image. As indicated by line 62, the S-polarized light from illumination arrangement 34 which spatial light modulator does not change, and therefore remains S-polarized light, is directed back toward illumination arrangement 34. As indicated by line 60, the S-polarized light from illumination arrangement 34 which spatial light modulator changes to P-polarized light passes through film 64 and is directed toward mirror 42 through quarter wave plate 58. Mirror 42 reflects light 60 back through quarter wave plate 58 which, since light 60 has passed through quarter wave plate 58 twice, changes light 60 back to S-polarized light. And finally, polarizing beam splitting film 64 directs this S-polarized light out of cube 48 through external face 66 into area 46 which extends outwardly from face 66.

The components of the above described arrangement are mutually disposed and the curvature of mirror 42, which in this case is a magnifying mirror, is established so as to produce a viewable magnified image of the pattern of modulated light created at and by spatial light modulator 36. This image is viewable when a viewer places an eye within viewing area 46 which extends outward from the fourth face 66 of cube 48 and when the eye is directed generally toward face 66 of the cube. This viewable image is made luminous by light from illumination arrangement 34 as modulated by the polarization control effected by spatial light modulator 36 in cooperation with polarizing beam splitter film 64 and auxiliary polarizer 52, if included.

This novel arrangement affords a number of advantageous features. The folding of the optical path which extends from the illumination arrangement to the reflective spatial light modulator to the magnifying mirror and thence finally to the viewing area produces a compact overall display system. Moreover, the separation between the illumination arrangement and the spatial light modulator provides the opportunity to collect the light emitted by the light source with appropriate optical components and to direct a very large proportion of the emitted light through the display components and into the viewing area, thereby producing a bright image via efficient use of light. Thus, the display of the present invention is made more suitable for operation from batteries than other displays. Additionally, the various optical components of the display arrangement may optionally be cemented to the polarizing beam splitting cube to produce a very rugged assembly which cannot become misaligned. Clearly, if it is desired that the viewable image be focusable to provide for the differing vision of different viewers, then either the spatial light modulator or the magnifying mirror must be moveable relative to the other components.

In one preferred embodiment of the present invention, the above described assembly forms a real image of illumination arrangement 34 within viewing area 46 and simultaneously forms a virtual image of the pattern of modulated light produced by and at spatial light modulator 36 which is directly visible by a viewer from viewing area 46. The real image of illumination arrangement 34 is formed within viewing area 46 because illumination arrangement 34 is positioned a distance about twice the focal length of mirror 42 from mirror 42 as discussed in previously recited pending U.S. patent Ser. No. 08/362,234, Attorney Docket Number DIS1P005 which also describes the advantages of this arrangement.

Referring to FIG. 2B, an alternative configuration of the above described embodiment, generally indicated by reference numeral 68, will be described. In this configuration, all of the components making up the assembly are the same as those described above. However, spatial light modulator 36 is positioned adjacent to face 66 of cube 48 and the assembly is viewed from viewing area 46 which is now located adjacent to face 54 of cube 48. This configuration operates in a similar manner to the assembly shown in FIG. 2A except as shown by lines 70 and 72, which indicate light provided by illumination arrangement 34, the light from illumination arrangement 34 is directed through cube 48 in a different way. As shown in FIG. 2B, light 70 and 72 from illumination arrangement 34 passes through auxiliary polarizer 52 which allows light of only one polarization, for example P-polarized light, to pass through into cube 48. Since, film 64 is a polarizing beam splitting film, film 64 allows the vast majority of the P-polarized light to pass through into spatial light modulator 36. As described above, spatial light modulator 36 modulates the light by forming a pattern of S-polarized and P-polarized light which is directed back into cube 48. As indicated by line 70, when spatial light modulator 36 changes the polarization of light 70 to S-polarized light, film 64 directs the light through quarter wave plate 58 into mirror 42. Mirror 42 reflects light 70 back through quarter wave plate and into cube 48. Since quarter wave plate 58 has changed light 70 back to P-polarized light, film 64 allows light 70 to pass through into viewing area 46 such that a virtual image of the pattern of modulated light is viewable from viewing area 46. As indicated by line 72, when spatial light modulator 36 does not change the polarization of light 72, film 64 allows light 72 to pass through film 64 back toward illumination arrangement 34.

Although only two specific configurations of this embodiment have been described, it should be understood that the present invention may be configured in a wide variety of ways with the various components of the assembly being positioned adjacent to various faces of the cube. Also, although the optics arrangement has been described as including a polarizing beam splitting cube, this is not a requirement of the present invention. Other optical elements, such as a coated pellicle or glass plate in air, may provide the polarizing beam splitting function and still remain within the scope of the present invention. One alternative to the polarizing beam splitting cube is illustrated in FIG. 2C.

As shown in FIG. 2C, a second embodiment of the present invention generally designated by reference numeral 74 includes the same components located in the same positions as the assembly of FIG. 2A except that polarizing beam splitting cube 48 is replaced with a non-polarizing beam splitting cube 76. Also, an auxiliary analyzer 78 is positioned adjacent to non-polarizing beam splitting cube 76 between cube 76 and viewing area 46. As shown by line 80 which indicates light provided by illumination arrangement 34, auxiliary polarizer 52 allows light of one polarization, for example S-polarized light, from illumination arrangement 34 to pass into cube 76. Beam splitting cube 76 includes a beam splitting film 82 positioned within and in this case diagonally through cube 76 with one side facing illumination arrangement 34 and spatial light modulator 36 and the other side facing mirror 42 and viewing area 46. Beam splitting film 82 directs a first portion of this S-polarized light into spatial light modulator 36 and allows a second portion of the light to pass through cube 76. As shown by dashed line 84, this second portion of light is blocked from passing into viewing area 46 by auxiliary analyzer 78. Light 80, which is directed into spatial light modulator 36, is modulated forming a pattern of modulated light including S-polarized light and P-polarized light depending on the modulating state of the light modulating medium as described above. This modulated light is directed back into cube 76 and beam splitting film 82 directs a first portion of the modulated light back toward illumination arrangement 34 as indicated by dashed line 86 and allows a second portion of the modulated light to pass though to mirror 42. This embodiment does not require quarter wave plate 58, however, quarter wave plate 58 may be included depending on which polarization of light from spatial light modulator is chosen to be used to form the magnified image viewable from viewing area 46. In the version of this embodiment shown in FIG. 2C, quarter wave plate 58 is included and therefore reverses the polarization of the pattern of modulated light directed back into cube 76. Again, beam splitting film 82 allows a first portion of the light from mirror 42 to pass through cube 76, as indicated by dashed line 88, and directs a second portion of the light from mirror 58 into viewing area 46 through auxiliary analyzer 78. And finally, auxiliary analyzer 78 blocks one polarization of light, in this case S-polarized light, and allows the other polarization to pass through to viewing area 46 thereby allowing a magnified image of the pattern of modulated light to be viewed from viewing area 46.

Although the arrangement shown in FIG. 2C does not use the light provided by illumination arrangement 34 as efficiently as the assembly shown in FIGS. 2A and 2B, that is, it requires much more light to achieve the same image brightness, the assembly of FIG. 2C does reduce a problem which may occur in the assemblies shown in FIGS. 2A and 2B. When the assembly of the present invention is a color version of an image generator which must modulate light of different colors, the polarizing beam splitting cube of FIGS. 2A and 2B is not completely efficient at allowing only light of one polarization to pass through the polarizing beam splitting film. Because the film can not be designed to act on light of all wavelengths in the same way, some light of the wrong polarization passes through, or leaks through, the film into viewing area 46 without ever being modulated by spatial light modulator 36. For example, referring back to FIG. 2A, when a color version of the assembly is used, some of the S-polarized light of some of the wavelengths of light which is directed into cube 48 from illumination arrangement 34 leaks through polarizing beam splitting film 64 and passes directly into viewing area 46. This leakage of light reduces the contrast of the image and degrades the quality of the image or causes a ghosting effect. Therefore, the arrangements shown in FIGS. 2A and 2B are best suited for monochrome systems although they can also be used for a color system.

The above described assemblies illustrated in FIG. 2A–C differ from the prior art. The present invention utilizes the same optic to illuminate the focal plane and to view the focal plane, whereas the prior art only uses the optic to view the focal plane. By using the same optic twice in this manner the present invention reduces the complexity of the system, resulting in a smaller and more compact arrangement which maximizes the use of the components. Also, since the components making up the assembly are small and may be directly attached to the cube, the overall assembly may easily be made very rugged and still light weight. Furthermore, many of the components may be molded plastic components for light weight and low cost.

Figure 3A:
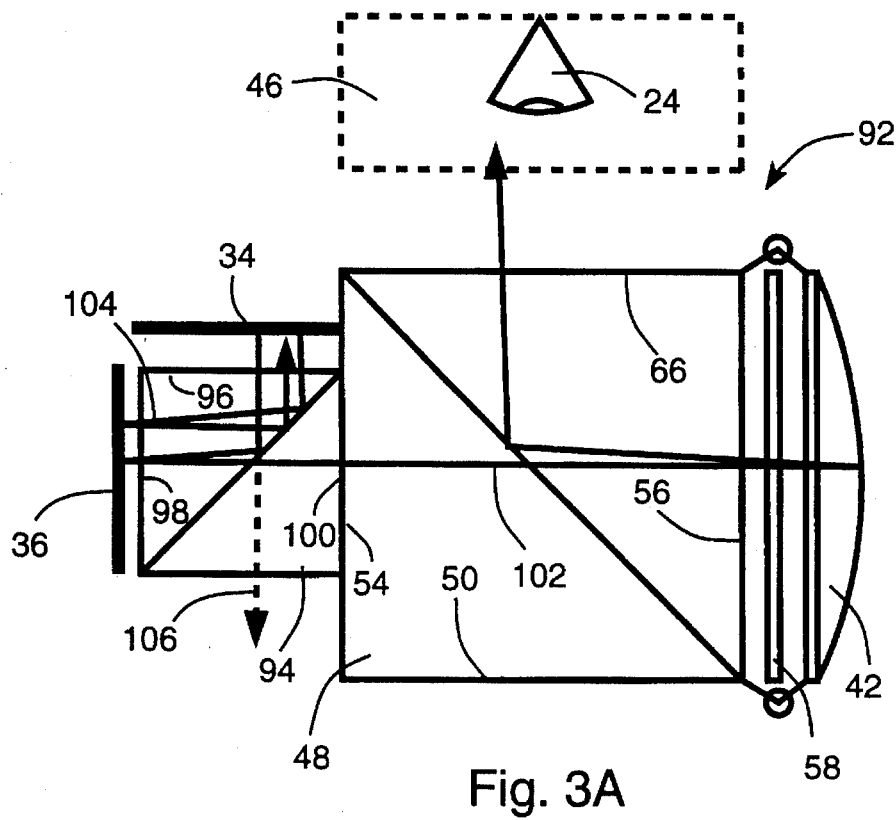
FIG. 3A is a diagrammatic side view of a first version of a third embodiment of a miniature image generating system designed in accordance with the present invention.

Although the assembly shown in FIG. 2C solves the above described ghosting problem, it can be improved upon from an efficiency of light standpoint. Therefore, additional embodiments of the present invention illustrated in FIGS. 3A–E are provided. As shown in FIG. 3A, a third embodiment of the present invention generally designated by reference numeral 92 includes many of the same components as described above for FIG. 2A. Assembly 92 includes illumination arrangement 34, spatial light modulator 36, mirror 42, predetermined area 46, polarizing beam splitting cube 48, and quarter wave plate 58. However, assemble 92 further includes an additional polarizing beam splitting cube 94. In this particular configuration of this embodiment and as shown in FIG. 3A, illumination arrangement 34 is positioned adjacent to a first external face 96 of cube 94 and spatial light modulator 36 is positioned adjacent to a second external face 98 of cube 94. Cube 94 has a third external face 100 which is positioned adjacent external face 54 of cube 48. As was the case for FIG. 2A, mirror 42 and quarter wave plate 58 are positioned adjacent face 56 of cube 48 and viewing area 46 is adjacent face 66 of cube 48.

Still referring to FIG. 3A, lines 102 and 104 which represent light provided by illumination arrangement 34, illustrate the operation of assembly 92. As indicated by lines 102 and 104, light from illumination arrangement 34 is directed into polarizing beam splitting cube 94 which directs light of one polarization, for example S-polarized light, into spatial light modulator 36 and allows light of the opposite polarization, in this case P-polarized light, to pass through the cube. As indicated by line 102, if spatial light modulator 36 does not change the polarization of the light cube 94 directs this light back toward illumination arrangement 34. However, if spatial light modulator 36 does change the polarization of the S-polarized light to P-polarized light, cube 94 allows the P-polarized light to pass into cube 48. As was described above for FIG. 2A, this P-polarized light passes through cube 48 and is directed back into cube 48 by mirror 42 and is changed to S-polarized light by quarter wave plate 58. Polarizing beam splitting cube 48 them directs this S-polarized light in to viewing area 46.

The extra cube 94 is added to the assembly to eliminate the ghosting problem without reducing the efficiency at which the illumination arrangement is utilized. In a color version of this embodiment, any S-polarized light which leaks through cube 94 does not pass into viewing area 46 as indicated by dashed line 106, therefore eliminating the ghosting problem.

Figure 3B:
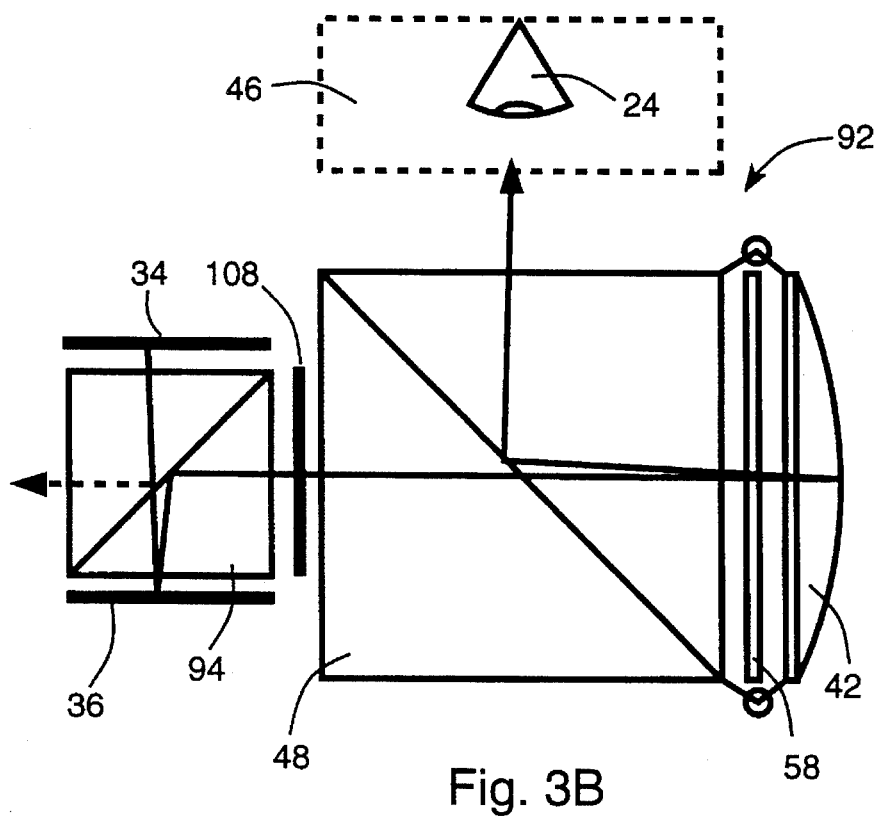
FIG. 3B is a diagrammatic side view of a second version of the third embodiment of a miniature image generating system designed in accordance with the present invention.

An additional benefit of the embodiment described immediately above is that adding the second cube allows the various components to be positioned in a wide variety of locations depending on the specific requirements of the application in which the assembly is to be used. One such variation of this embodiment is illustrated in FIG. 3B and includes a half wave plate 108 positioned between the two cubes. It should be understood that the present invention may take on a wide variety of specific configurations with the various components being located in a wide variety of positions and mutual orientations and still remain within the scope of the present invention. Also, quarter wave plates, half wave plates, mirrors, auxiliary polarizers, auxiliary analyzers, and other conventional optical elements may be incorporated in order to configure an assembly designed in accordance with the present invention. The present invention equally applies to all of these variations. As described in detail in the referenced pending U.S. patent Ser. No. 08/362,234, Attorney Docket Number DIS1P005, for some types of illumination arrangements, additional mirrors, quarter or half wave plates, and other optical elements may be added to the present invention in appropriate locations in order to redirect and convert portions of the wasted light back into the assembly so that it may be used to improve the efficiency of the assembly.

Figure 3C:
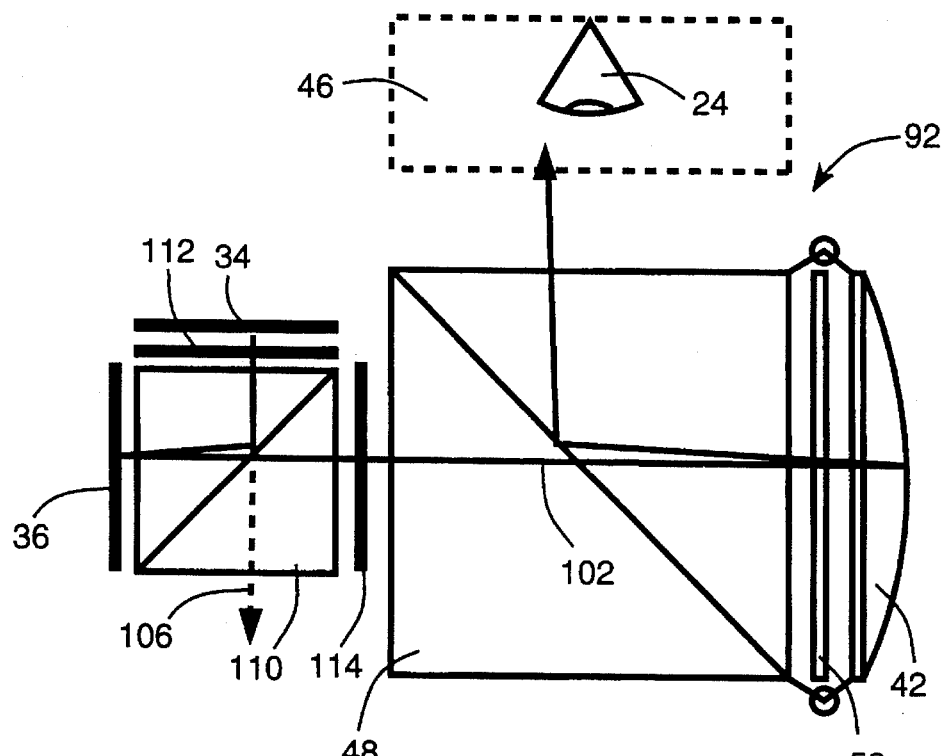
FIG. 3C is a diagrammatic side view of a third version of the third embodiment of a miniature image generating system designed in accordance with the present invention.

As was described above for the first embodiment of the present invention, it is not a requirement of the present invention that the cubes be polarizing beam splitting cubes. As shown in FIG. 3C, the added polarizing beam splitting cube 94 of FIG. 3A may be replaced with a non-polarizing beam splitting cube 110. In this version, auxiliary polarizer 112 is positioned between illumination arrangement 34 and cube 110 and auxiliary analyzer 114 is positioned between cube 110 and cube 48.

Figure 3D:
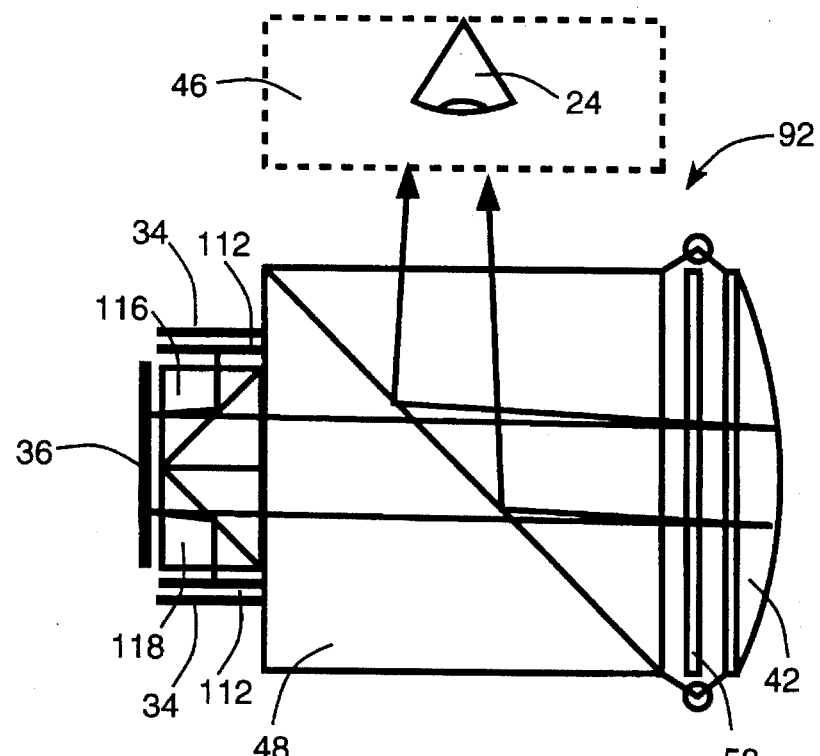
FIG. 3D is a diagrammatic side view of a fourth version of a third embodiment of a miniature image generating system designed in accordance with the present invention.
Figure 3E:
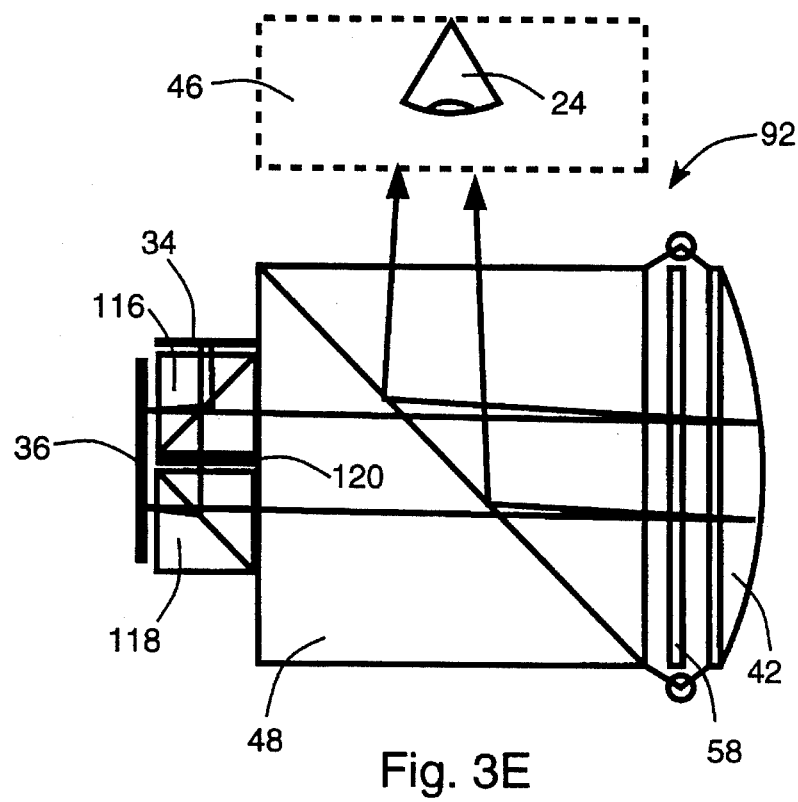
FIG. 3E is a diagrammatic side view of a fifth version of a third embodiment of a miniature image generating system designed in accordance with the present invention.

Although adding the second cube to the present invention solves the ghosting problem, this approach does add to the bulk of the overall assembly. This bulk disadvantage may be substantially reduced by subdividing the added cube into more than one additional cube as illustrated in FIGS. 3D and 3E. As shown in FIG. 3D, cube 94 of FIG. 3A is replaced with two smaller cubes 116 and 118 each having an associated illumination arrangement 34 and auxiliary polarizer 112 positioned adjacent an appropriate external face of the cubes. This configuration reduces the added bulk of the assembly while still eliminating the ghosting problem. Alternatively, as shown in FIG. 3E, cube 94 of FIG. 3A is replaced with two cubes 116 and 118 as described above for FIG. 3D except that only one illumination arrangement 34 without an auxiliary polarizer is positioned adjacent to an appropriate external face of one of cubes 116 and 118, in this case cube 116. For this version of the system, a half wave plate 120 is positioned between cube 116 and 118. As described in detail in previously recited pending U.S. patent Ser. No. 08,362,234, Attorney Docket Number DIS1P005, this arrangement provides the additional advantage of more efficiently using the light provided by illumination arrangement 34. This is because light of one polarization, for example S-polarized light, is used to illuminate the portion of spatial light modulator 36 which is associated with cube 116. And, instead of wasting the light of the other polarization, in this case P-polarized light, this light is convened to S-polarized light by half wave plate 120 and is used to illuminate the portion of spatial light modulator 36 which is associated with cube 118.

Another advantage provided by adding additional cubes as described above for FIGS. 3A-E is that the system may be used as a visual display with see through capability. Since the large cube 48 of each of these systems is transparent, the viewer can see through the display to the external environment while simultaneously viewing the image provided by the spatial light modulator. This see through capability may also be provide for systems using a single cube by modifying the components or rearranging the components as will be described in more detail hereinafter.

Another arrangement which may be used to provide the see through capability while using only a single cube is shown in FIG. 2B. For this arrangement to be used as a see through display, mirror 42 is formed as an interior surface within a transparent window 126. In this embodiment of the present invention, mirror 42 allows the viewer to at least partially see through mirror 42, and, mirror 42 at least partially reflects light from spatial light modulator 36 into viewing area 46.

Figure 4:
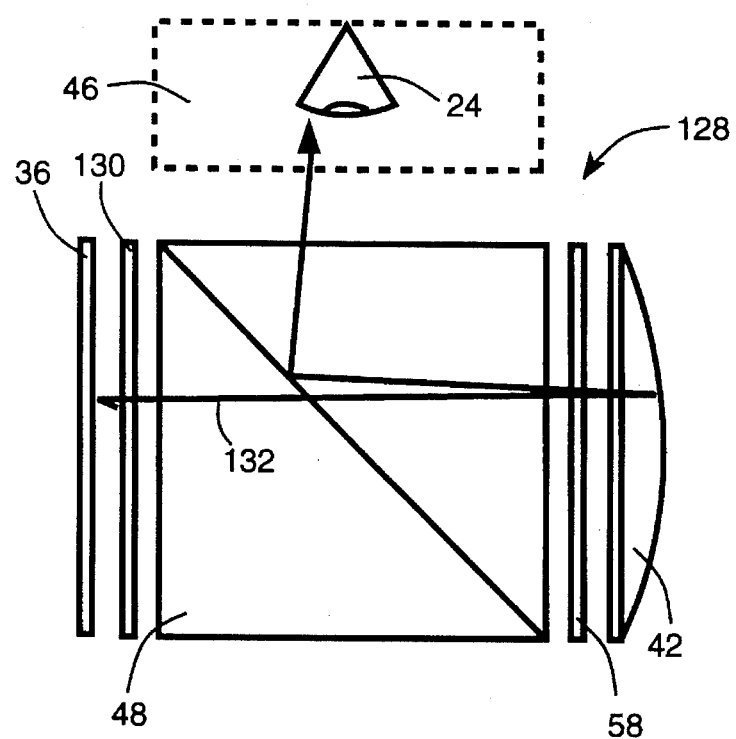
FIG. 4 is a diagrammatic side view of a fourth embodiment of a miniature image generating system designed in accordance with the present invention.

Referring now to FIG. 4, a final embodiment of the present invention, generally designated by reference numeral 128, will be described. System 128 includes reflective type spatial light modulator 36, polarizing beam splitting cube 48, mirror 42, quarter wave plate 58, and viewing area 46 as have been described above for previous embodiments. However, in this embodiment, system 128 includes a transparent light source arrangement 130 which is positioned between spatial light modulator 36 and cube 48. Some examples of such a transparent light source arrangement are an edge illuminated holographic optical element or a novel light emitting diode arrangement, both of which are described in detail in previously recited pending U.S. patent Ser. No. 08/362,234, Attorney Docket Number DIS1P005. As indicated by line 132, polarized light from transparent light source arrangement 130 is directed into spatial light modulator 36 which modulates the light and reflects the light back through transparent light source arrangement 130 into cube 48. From this point, the operation of system 128 is the same as has been described above for other embodiments of the present invention.

One of the advantages the present invention provides is that the use of a focusing reflecting mirror improves the chromatic aberrations which may be caused by using a more conventional refractive type lens since refractive lenses refract light of different wavelengths in slightly different ways. This is especially true as the assembly is scaled down further and further which is possible using optics arrangements of the present invention and spatial light modulator such as those described in detail in the referenced pending U.S. patent Ser. No. 08/362,665, Attorney Docket Number DIS1P003.

Although only several specific embodiments of the present invention have been described in detail, it should be understood that the present invention may be embodied in many other specific forms without departing from the spirit or scope of the invention. For instance, as mentioned above, although most of the embodiments described used polarizing beam splitting cubes, non-polarizing beam splitting cubes also fall within the scope of the present invention. Furthermore, although all of the embodiments were described as including a beam splitting cube, these optical components are not required to be cubes but instead may take on a wide variety of specific shapes so long as they perform the beam splitting function required by the present invention. For example, the beam splitting cube may be replaced with an appropriately supported beam splitting film positioned to provide the same function as the beam splitting film internally supported within the cubes described above.

Although each of the above described embodiments have been describe with the various components having particular respective orientations, it should be understood that the present invention may take on a wide variety of specific configurations with the various components being located in a wide variety of positions and mutual orientations and still remain within the scope of the present invention. Quarter wave plates, half wave plates, mirrors, auxiliary polarizers, auxiliary analyzers, and other conventional optical elements may be incorporated in order to configure an assembly designed in accordance with the present invention in a wide variety of particular configurations. Additional lenses, mirrors or other light control components such as diffusers, lenslets, and holographic optical elements, among others, may be incorporated into the illuminator to control or to make efficient or effective use of the light emitted by the source. Further, additional components having optical power may be included which operate in conjunction with the magnifying mirror as a means to determine the position of the viewing region relative to the other parts of the arrangement or to control the field of view, resolution, aberrations or other optical characteristics of the viewable image. The function and use of such additional components are held to be familiar to those skilled in the art and are therefore to be regarded as falling within the scope of the present invention. The present invention equally applies to all of these variations. As described in detail in the referenced pending U.S. patent Ser. No. 08/362,234, Attorney Docket Number DIS1P005, for some types of illumination arrangements, additional mirrors, quarter or half wave plates, and other optical elements may be added to the present invention in appropriate locations in order to redirect and convert portions of the wasted light back into the assembly so that it may be used to improve the efficiency of the assembly.

Therefore, the present examples are to be considered as illustrative and not restrictive, and the invention is not to be limited to the details given herein, but may be modified within the scope of the appended claims.

What is claimed is:

1. An assembly for producing a visual display said assembly comprising:

(a) a light reflecting type spatial light modulator including a light reflecting surface cooperating with a light modulating medium switchable between different states so as to act on light in ways which form an overall pattern of reflected, modulated light, and means for switching said modulating medium between said different states in a controlled way so as to form said overall pattern;

(b) illumination means for providing a particular source of light; and (c) optics means including a first member defining a light reflecting surface configured to direct reflected light into a predetermined area and a second member defining a first external face located in proximity to said illumination means, a second external face located in proximity to said spatial light modulator, a third external face located in proximity to the light reflecting surface of said first member, and a fourth external face, said optics means cooperating with said illumination means and said spatial light modulator such that said spatial light modulator forms said overall pattern of light from light provided by said particular source of light and such that the light reflecting surface of said first member directs light provided by the particular source of light from said spatial light modulator into said predetermined area extending outwardly from the fourth face of said second member in a way which allows a magnified image of the overall pattern of light formed at and by said spatial light modulator to be viewed from within said predetermined area, said overall pattern of light serving as said visual display.

2. An assembly according to claim 1 wherein said first member directs light provided by the particular source of light from said spatial light modulator into said predetermined area extending outwardly from the fourth face in a way which forms a real image of said particular source within said predetermined area, whereby the magnified image of the overall pattern of light formed by said spatial light modulator can be viewed, in its entirety, from within said predetermined area.

3. An assembly according to claim 1 wherein said illumination means produces unpolarized light which serves initially as said particular source of light, wherein said spatial light modulator acts on specifically polarized light, and wherein said optics means includes polarizing means, located optically between said illumination means and said predetermined area, for polarizing the particular source of light in ways which allow said spatial light modulator to form said overall pattern of light and which allow the light reflecting surface of said first member to direct the particular source of light from said spatial light modulator into said predetermined area so that the magnified image of the overall pattern of light formed by said spatial light modulator can be viewed, in its entirety, from within said predetermined area.

4. An assembly according to claim 3 wherein said polarizing means includes a polarizer-analyzer which forms part of said second member.

5. An assembly according to claim 4 wherein said second member is a polarizer-analyzer beam splitting cube which defines said first through fourth external faces.

6. An assembly according to claim 5 wherein said polarizing means includes a prepolarizer positioned optically between said illumination source and the first external face of said cube.

7. An assembly according to claim 5 wherein said polarizing means includes a quarter-wave plate positioned optically between the light reflecting surface of said first member and the third external face of said cube.

8. An assembly according to claim 7 wherein the light modulating medium of said spatial light modulator is ferroelectric liquid crystal material and wherein the switching means of said spatial light modulator includes active matrix circuitry.

9. An assembly according to claim 3 wherein said polarizing means includes a prepolarizer positioned optically between said illumination source and the first external face of said second member.

10. An assembly according to claim 3 wherein said polarizing means includes a quarter-wave plate positioned optically between the light reflecting surface of said first member and the third external face of said second member.

11. An assembly according to claim 3 wherein said second member is a beam splitting cube which defines said first through fourth external faces and which does not include polarizing-analyzing capabilities and wherein said polarizing means includes a polarizer positioned optically between said illumination source and the first external face of said cube and an analyzer positioned optically between said predetermined area and the fourth external face of said cube.

12. An assembly according to claim 11 wherein said polarizing means includes a quarter-wave plate positioned optically between the light reflecting surface of said first member and the third external face of said cube.

13. An assembly for producing a visual display, said assembly comprising:

(a) a light reflecting type spatial light modulator including a light reflecting surface cooperating with a layer of liquid crystal material serving as a light modulating medium switchable between different states so as to act on particularly polarized light in ways which form an overall pattern of modulated light, and means including active matrix circuitry for switching said modulating medium between said different states in a controlled way so as to form said overall pattern;

(b) illumination means for providing a particular source of unpolarized light; and (c) optics means including (i) means defining a light reflecting surface configured to direct reflected light into a predetermined area, (ii) a polarizer-analyzer beam splitting cube defining a first external face located in proximity to said illumination means, a second external face located in proximity to said spatial light modulator, a third external face located in proximity to the light reflecting surface, and a fourth external face, (iii) a prepolarizer positioned optically between said illumination source and the first external face of said cube, and (iv) a quarter-wave plate positioned optically between the light reflecting surface of said light reflecting surface and the third external face of said cube, said optics means cooperating with said illumination means and said spatial light modulator such that said spatial light modulator forms said overall pattern of light from light provided by said particular source of light and such that said means defining a light reflecting surface directs light provided by the particular source of light from said spatial light modulator into said predetermined area extending outwardly from the fourth face of said second member in a way which allows a magnified image of the overall pattern of light formed at and by said spatial light modulator to be viewed from within said predetermined area while at the same time producing a real image of said source of light within said predetermined area, said overall pattern of light serving as said visual display.

14. An assembly according to claim 13 wherein said spatial light modulator is of the reflective type including a light reflecting surface.

15. An assembly according to claim 14 wherein said polarizer-analyzer beam splitting cube includes an internal polarizing-analyzing film within the cube such that said first and fourth external faces of the cube lie on one side of and confront said polarizing-analyzing film and said second and third faces of the cube lie on the opposite side of and confront said polarizing-analyzing film.

16. An assembly according to claim 14 wherein said polarizer-analyzer beam splitting cube includes an internal polarizing-analyzing film within the cube such that said first and second faces of the cube lie on one side of and confront said polarizing-analyzing film and said third and fourth faces of the cube lie on the opposite side of and confront said polarizing-analyzing film.

17. An assembly for producing a visual display, said assembly comprising:

(a) a light reflecting type of spatial light modulator including a light reflecting surface cooperating with a light modulating medium switchable between different states so as to act on light in ways which form an overall pattern of reflected, modulated light, and means for switching said modulating medium between said different states in a controlled way so as to form said overall pattern;

(b) illumination means for providing a particular source of light; and (c) optics means including (i) a first member defining a light reflecting surface configured to direct reflected light into a predetermined area, (ii) a second member defining a first external face located in proximity to said illumination means, a second external face located in proximity to said spatial light modulator, and a third external face, and (iii) a third member defining a first external face immediately adjacent the third face of said second member, a second external face located in proximity to the light reflecting surface of said first member, and a third external face, said optics means cooperating with said illumination means and said spatial light modulator such that said spatial light modulator forms said overall pattern of light from light provided by said particular source of light and such that the light reflecting surface of said first member directs light provided by the particular source of light from said spatial light modulator into said predetermined area extending outwardly from the third face of said third member in a way which allows a magnified image of the overall pattern of light formed at and by said spatial light modulator to be viewed from within said predetermined area, said overall pattern of light serving as said visual display.

18. An assembly according to claim 17 wherein said third member is a polarizer-analyzer beam splitting cube.

19. An assembly according to claim 18 wherein said second member is a polarizer-analyzer beam splitting cube.

20. An assembly according to claim 17 wherein said first member directs light provided by the particular source of light from said spatial light modulator into said predetermined area extending outwardly from the third face of said third member in a way which forms a real image of said particular source of light within said predetermined area and such that said magnified image of the overall pattern of light formed by said spatial light modulator can be viewed, in its entirety, from within said predetermined area.

21. An assembly according to claim 17 wherein said illumination means produces unpolarized light which serves initially as said particular source of light, wherein said spatial light modulator acts on specifically polarized light and wherein said optics means includes means located optically between said illumination means and said spatial light modulator for polarizing the particular source of light in ways which allow said spatial light modulator to form said overall pattern of light and which allow the light reflecting surface of said first member to direct light provided by the particular source of light from said spatial light modulator into the predetermined area so that a magnified image of the overall pattern of light formed by said spatial light modulator can be viewed, in its entirety, from within said predetermined area.

22. An assembly according to claim 21 wherein said polarizing means includes a polarizer-analyzer which forms part of each of said second and third members.

23. An assembly according to claim 22 wherein each of said second and third members is a polarizer-analyzer beam splitting cube which defines its respective external faces, said second member cube including an internal polarizing-analyzing film within the cube such that its first and second faces lie on one side of and confront said polarizing-analyzing film and its third face and a fourth face of the cube lie on the opposite side of and confront said polarizing-analyzing film, and said third member cube including an internal polarizing-analyzing film within the cube such that its first face and a fourth face of the cube lie on one side of and confront said polarizing-analyzing film and its second and third faces lie on the opposite side of and confront said polarizing-analyzing film.

24. An assembly according to claim 23 wherein said polarizing means includes a quarter-wave plate positioned optically between the light reflecting surface of said first member and the second external face of third member.

25. An assembly according to claim 24 wherein the light modulating medium of said spatial light modulator is ferroelectric liquid crystal material and wherein the switching means of said spatial light modulator includes active matrix circuitry.

26. An assembly according to claim 22 wherein each of said second and third members is a polarizer-analyzer beam splitting cube which defines its respective external faces, said second member cube including an internal polarizing-analyzing film within the cube such that its fast face and a fourth face lie on one side of and confront said polarizing-analyzing film and its second and third faces lie on the opposite side of and confront said polarizing-analyzing film, and said third member cube including an internal polarizing-analyzing film within the cube such that its first face and a fourth face of the cube lie on one side of and confront said polarizing-analyzing film and its second and third faces lie on the opposite side of and confront said polarizing-analyzing film.

27. An assembly according to claim 26 wherein said polarizing means includes a half-wave plate positioned optically between the third face of said second member cube and the fast face of said third member cube.

28. An assembly for producing a visual display, said assembly comprising:

(a) a light reflecting type spatial light modulator including a light reflecting surface cooperating with a light modulating medium switchable between different states so as to act on light in ways which form an overall pattern of reflected, modulated light, and means for switching said modulating medium between said different states in a controlled way so as to form said overall pattern;

(b) illumination means for providing at least one particular source of light; and (c) optics means including (i) a first member defining a light reflecting surface configured to direct reflected light into a predetermined area, (ii) a second member including at least two adjacently positioned submembers at least one submember of which defines a first external face located in proximity to a corresponding one of said particular sources of light and all of the submembers of which together define a second external face located in proximity to said spatial light modulator and a third external face, and (iii) a third member defining a first external face immediately adjacent the third face of the submembers of said second member, a second external face located in proximity to the light reflecting surface of said first member, and a third external face, said optics means cooperating with said illumination means and said spatial light modulator such that said spatial light modulator forms said overall pattern of light from light provided by said particular sources of light and such that the light reflecting surface of said first member directs light provided by the particular sources of light from said spatial light modulator into said predetermined area extending outwardly from the third face of said third member in a way which allows a magnified image of the overall pattern of light formed at and by said spatial light modulator to be viewed from within said predetermined area, said overall pattern of light serving as said visual display.

29. An assembly according to claim 28 wherein said optics means further includes a half wave plate positioned between a first one of said submembers and a second one of said submembers.

30. An assembly according to claim 28 wherein each of said submembers defines a first external face located in proximity to a corresponding one of said particular sources of light.

31. An assembly according to claim 28 wherein each of the submembers of said second member is a polarizer-analyzer beam splitting cube.

32. An assembly according to claim 31 wherein each of the submember cubes of said second member includes an internal polarizing-analyzing film within the cube such that the first and the second faces of said submember cubes lie on one side of and confront said polarizing-analyzing film and the third faces of said submember cubes lie on the opposite side of and confronts said polarizing-analyzing film.

33. An assembly according to claim 32 wherein said third member is a polarizer-analyzer beam splitting cube.

34. An assembly according to claim 33 wherein said third member cube includes an internal polarizing-analyzing film within the cube such that its first face lies on one side of and confronts its polarizing-analyzing film and its second and third faces lie on the opposite side of and confront its polarizing-analyzing film.

35. An assembly for producing a visual display, said assembly comprising:

(a) a spatial light modulator including a light modulating medium switchable between different states so as to act on light in ways which form an overall pattern of modulated light, and means for switching said modulating medium between said different states in a controlled way so as to form said overall pattern;

(b) illumination means for providing a particular source of light; and (c) optics means including at least two polarizer-analyzer beam splitting cubes positioned immediately adjacent one another and immediately adjacent said illumination means and said spatial light modulator in a predetermined manner, said optics means cooperating with said illumination means and said spatial light modulator such that said spatial light modulator forms said overall pattern of light from light provided by said particular source of light and such that the optics means directs light provided by the particular source of light from said spatial light modulator into a predetermined area extending outwardly from one of the cubes in a way which allows a magnified image of the overall pattern of light formed at and by said spatial light modulator to be viewed from within said predetermined area, said overall pattern of light serving as said visual display.

36. An assembly according to claim 35 wherein said optics means includes at least three of said cubes.

37. An assembly according to claim 35 wherein said spatial light modulator is of the light reflecting type.

38. An assembly for producing a visual display, said assembly comprising:

(a) a reflective type spatial light modulator including a light reflecting surface cooperating with a light modulating medium switchable between different states so as to act on light in ways which form an overall pattern of reflected, modulated light, and means for switching said modulating medium between said different states in a controlled way so as to form said overall pattern;

(b) a light arrangement including removably replaceable illumination means for providing a particular source of light; and (c) optics means including means defining a light reflecting surface configured to direct reflected light into a predetermined area and a polarizer-analyzer beam splitting cube having one face thereof attached to said light arrangement in a way which allows said illumination means to be removed and replaced, a second face thereof attached to said spatial light modulator, a third face thereof attached to said means defining said light reflecting surface in a way which allows said light reflecting surface to be adjustably moved to a limited extent towards and away from said third face, and a fourth face, said optics means cooperating with said light arrangement and said spatial light modulator such that said spatial light modulator forms said overall pattern of light from light provided by said particular source of light and such that said light reflecting surface directs light provided by the particular source of light from said spatial light modulator into said predetermined area extending outwardly from the fourth face of said cube in a way which allows a magnified image of the overall pattern of light formed at and by said spatial light modulator to be viewed, from within said predetermined area, said overall pattern of light serving as said visual display.

39. An assembly for producing a visual display, said assembly comprising:

(a) a spatial light modulator including a light modulating medium switchable between different states so as to act on light in ways which form an overall pattern of modulated light, and means for switching said modulating medium between said different states in a controlled way so as to form said overall pattern;

(b) illumination means for providing a particular source of light; and (c) optics means including a first member defining a light reflecting surface configured to direct reflected light into a predetermined area and a second member defining a first external face located in proximity to said spatial light modulator, a second external face located in proximity to the light reflecting surface of said first member, and a third external face, said optics means cooperating with said illumination means and said spatial light modulator such that said spatial light modulator forms said overall pattern of light from light provided by said particular source of light and such that the light reflecting surface of said first member directs light provided by the particular source of light from said spatial light modulator into said predetermined area extending outwardly from the third face of said second member in a way which allows a magnified image of the overall pattern of light formed at and by said spatial light modulator to be viewed from within said predetermined area, said overall pattern of light serving as said visual display.

40. An assembly according to claim 39 wherein said second member is a polarizer-analyzer beam splitting cube which defines said first through third external faces.

41. An assembly according to claim 39 wherein said spatial light modulator is of the light reflecting type.

42. An assembly according to claim 41 wherein said illumination means is transparent and wherein said illumination means is positioned between said spatial light modulator and said first external face of said second member.

43. An assembly for producing a visual display, said assembly comprising:

(a) a reflective type spatial light modulator including a light reflecting surface cooperating with a light modulating medium switchable between different states so as to act on light in ways which form an overall pattern of reflected, modulated light, and means for switching said modulating medium between said different states in a controlled way so as to form said overall pattern;

(b) a light arrangement including removably replaceable illumination means for providing a particular source of light; and (c) optics means including means defining a light reflecting surface configured to direct reflected light into a predetermined area and a polarizer-analyzer beam splitting cube having one face thereof attached to said light arrangement in a way which allows said illumination means to be removed and replaced, a second face thereof attached to said spatial light modulator in a way which allows said spatial light modulator to be adjustably moved to a limited extent towards and away from said second face, a third face thereof attached to said means defining said light reflecting surface, and a fourth face, said optics means cooperating with said light arrangement and said spatial light modulator such that said spatial light modulator forms said overall pattern of light from light provided by said particular source of light and such that said light reflecting surface directs light provided by the particular source of light from said spatial light modulator into said predetermined area extending outwardly from the fourth face of said cube in a way which allows a magnified image of the overall pattern of light formed at and by said spatial light modulator to be viewed, from within said predetermined area, said overall pattern of light serving as said visual display.

* * * * *